US012582946B2

(12) United States Patent
Perdriel

(10) Patent No.: US 12,582,946 B2
(45) Date of Patent: Mar. 24, 2026

(54) ERGONOMIC DEVICE FOR MIXING FLUIDS WITH CONTROLLED METERING

(71) Applicants: EUROMECCANICA MAZZER S.R.L., Terracina (IT); POLCOMIX ITALIA SRL, Turin (IT)

(72) Inventor: Olivier Guillaume François Perdriel, Turin (IT)

(73) Assignees: EUROMECCANICA MAZZER S.R.L., Terracina (IT); POLCOMIX ITALIA SRL, Turin (IT)

( * ) Notice: Subject to any disclaimer, the term of this patent is extended or adjusted under 35 U.S.C. 154(b) by 396 days.

(21) Appl. No.: 18/251,285

(22) PCT Filed: Dec. 1, 2021

(86) PCT No.: PCT/IB2021/061160

§ 371 (c)(1),
(2) Date: May 1, 2023

(87) PCT Pub. No.: WO2022/118204

PCT Pub. Date: Jun. 9, 2022

(65) Prior Publication Data

US 2024/0017223 A1 Jan. 18, 2024

(30) Foreign Application Priority Data

Dec. 3, 2020 (IT) ........................ 102020000029639

(51) Int. Cl.
*B01F 23/21* (2022.01)
*B01F 23/30* (2022.01)
(Continued)

(52) U.S. Cl.
CPC .......... *B01F 25/3141* (2022.01); *B01F 23/21* (2022.01); *B01F 23/30* (2022.01); *B01F 35/32015* (2022.01); *B01F 35/7176* (2022.01)

(58) Field of Classification Search
CPC ................................ B01F 23/21; B01F 25/30
See application file for complete search history.

(56) References Cited

U.S. PATENT DOCUMENTS

| | | | | |
|---|---|---|---|---|
| 1,120,534 A | | 12/1914 | Pruden | |
| 3,939,073 A | | 2/1976 | Bats | |
| 5,993,054 A | * | 11/1999 | Tan | B01F 35/2202 366/160.2 |

FOREIGN PATENT DOCUMENTS

| | | |
|---|---|---|
| CA | 3090869 A1 | 8/2019 |
| EP | 1813345 A1 | 8/2007 |
| WO | 2013117918 A1 | 8/2013 |

OTHER PUBLICATIONS

International Search Report and Written Opinion of the ISA for PCT/IB2021/061160 dated Mar. 14, 2022, 12 pages.

* cited by examiner

*Primary Examiner* — Robert A Hopkins
(74) *Attorney, Agent, or Firm* — NIXON & VANDERHYE

(57) ABSTRACT

Disclosed is an ergonomic device for mixing fluids with controlled metering, provided with at least a mixing system adapted to allow an automatic mixing in predetermined quantities of an additive fluid with a primary fluid. The device includes: at least a first coupling flange and a second coupling flange, provided with a plurality of connection systems, which may be located in the zone, and seals adapted to contain fluid leaks; a substantially cylindrical body of the device adapted to house a mixing system; a mixing mechanism consisting of an axis and a plurality of blades; at least one ergonomic grip; possibly an integrated train of reduction gears which transmits the correct torque
(Continued)

and number of revolutions to the pump; at least one gear pump or equivalent device; possibly a gearbox; and a final metering nozzle.

20 Claims, 2 Drawing Sheets

(51) Int. Cl.

| | |
|---|---|
| ***B01F 25/31*** | (2022.01) |
| ***B01F 25/314*** | (2022.01) |
| ***B01F 35/32*** | (2022.01) |
| ***B01F 35/71*** | (2022.01) |

ERGONOMIC DEVICE FOR MIXING FLUIDS WITH CONTROLLED METERING

This application is the U.S. national phase of International Application No. PCT/IB2021/061160 filed Dec. 1, 2021 which designated the U.S. and claims priority to IT 102020000029639 filed Dec. 3, 2020, the entire contents of each of which are hereby incorporated by reference.

FIELD OF THE INVENTION

The present invention relates to the field of industrial devices for mixing and transferring fluids. More in detail, the object of this patent application is an ergonomic device which allows the automatic mixing of two or more fluids by predetermined metering thereof.

PRIOR ART

Traditionally there are various types of mixing devices which, depending on the uses, take up different configurations. The most technologically advanced ones, given the delicate task they have to perform, are the mixers for engines such as mixers for two-stroke engines or engine oil pumps; in such mixers the engine oil and the gasoline are placed in different containers, having the very important function of both introducing the right quantity of oil into the supply circuit, and managing the correct ratio in the oil-gasoline mixture.

Another type of mixer, which is increasingly required today, is the additive-fuel mixer for aircraft, ships or large means of transport equipped with tanks exposed to the risk of corrosion. For example, current avionic fuels consist of kerosene. This fuel, which is obtained through a refining process, reaches the end user with traces of impurities including water, which has the power to attack the walls of aircraft tanks over time. Furthermore, a new type of fuel made up of bio-kerosene has recently entered the market, which is substantially based on vegetable oils which, being natural, generate moisture and water separation, significantly increasing the production of sludge, molds, sediments, etc.; as a result of these phenomena corrosion of the aluminum that makes up the tanks occurs. The corrosion of the tanks has been the subject of studies and tests aimed at mitigating or eliminating the phenomenon triggered by the presence of water in fuels. Over the years it has been concluded that certain chemically synthesized additives contribute in an appreciable way to the reduction of the corrosion rate of the tank walls with consistent mitigation of costs and intervention and maintenance times. One of the first problems encountered is the introduction of the additive inside the tank itself: once introduced, in fact, the additive has such a chemical composition that it immediately binds with the kerosene, becoming thickened and creating clots if not suitably diluted. A second problem is to ensure that the quantity of additive supplied with respect to the quantity of fuel is adequate and does not exceed the maximum levels, causing the risk of even serious and severe damage.

A recovery intervention with disassembly, analysis and repair of the tanks of an aircraft can entail substantial costs, without considering the losses deriving from the downtime of the aircraft that are not expected among those for ordinary maintenance.

To date, the solution is an instrument that, during the fuel supply step, is capable of mixing it with the additive due to the presence of a pressurized tank which during the passage of kerosene gradually releases an adequate quantity of additive into the tank through a hole. The disclosed device does not guarantee a homogeneous mixing proportional to the flow of passing fuel. Another limitation of the disclosed device is the dependence on the operator who can, however, make mistakes and not guarantee correct metering.

As regards inventions, an example in this field is the patent CA3090869A1, disclosing a mixing apparatus for mixing a high viscosity fluid provided with a mixing shaft with a plurality of blades attached thereto, a powered hydraulic motor connected to the mixing shaft so as to rotate about the same, a hydraulic pump connected by a fluid circuit to the hydraulic motor so as to supply pressurized hydraulic fluid to the hydraulic motor, an electric motor operatively connected to the hydraulic pump, a fluid tank connected to the fluid circuit so as to supply fluid to the hydraulic pump. Such device, like all the devices described hereinabove, requires the intervention of an operator to allow not only the introduction of fluids but also the mixing itself.

To date, there does not seem to be a device capable of solving the above mentioned problems. For these reasons, the object of the present patent application is an ergonomic device (easy to handle, compact and lightweight) for precisely and automatically mixing a quantity of additive as a function of the flow of a primal fluid.

DESCRIPTION OF THE INVENTION

According to the present invention, an ergonomic device for mixing for mixing fluids with controlled metering, which effectively solves the above mentioned problems, is obtained. In a preferred embodiment, the device comprises at least a first coupling flange with a supply device and a second coupling flange with a tank loading device which connects the mixing device to a mouth of any loading device adapted to receive liquids.

The aforementioned first and second coupling flanges, after punctual checks and analysis of the installation environment, are equipped with a plurality of connection systems (such as metric-based, or Withworth, threads, gas, flat flanges, clamp, customized and sealed bayonet couplings, etc.). Appropriate seals, studied on a case by case basis, prevent fluid leaks.

A body of the device is the central structure inside which the passage of the fluid to be mixed is allowed at the required pressures; it has a substantially cylindrical shape and the mixing system is housed therein, which is automatically activated when the flow of a fluid passes therethrough. Depending on the type and position of the loading mouth to which the device must be connected, a type of grip and/or anchor is installed that allows the operator to use it in a simple and safe manner in handling phase. A "steering wheel" grip or a "180° dual cloche" grip are provided in a basic version of the mixing device whereas, in a further version, the body of the device includes a grip with collapsible or removable knobs.

In a further version, the body of the device is made in an elbow configuration in order to allow the connection to mouths as well, in the presence of undercuts or at a height higher than that of the operator's head.

The aforementioned mixing system, installed inside the body of the device, possibly comprises a plurality of gears which will be described below, designed to activate automatically following the injection of a stoichiometric quantity of a primary fluid, injected from a common external supply device, and an additive fluid. The additive fluid is supplied inside a suitable tank which can be adapted according to the intended use of the device and is automatically released, by a volumetric metering device, in a predetermined quantity, when the aforementioned primary fluid passes therethrough.

The gear pump or an equivalent device and the reduction train thereof, if any, is inserted inside the aforementioned body of the device and is designed to contain the volume of the mixing device in question and its seal. In a further version, the aforementioned gearbox is inserted in an external branch of the body of the device.

The aforementioned possible integrated train of reduction gears comprises a train of gear wheels and is designed to bring the number of revolutions and torque to the values required for the operation of the entire mixing system.

Torque and transmission ratio will be commensurate with the quantity of additive necessary to obtain the required metering and to guarantee the ratio expressed in volumes/volumes. The gear pump, or a device equivalent thereto, constitutes the member which generates pressure and flow rate of the additive fluid to be injected, in said stoichiometric quantity, into the flow of said primary fluid, Depending on the intended use, the pumping device is capable of covering a plurality of metered doses, possibly also by changing one or more components. Suitable add-ons will allow to vary, in terms of both flow rate and pressure, the mechanical characteristics of the fluid to be injected.

The gear pump, or a device equivalent thereto, possibly and additionally, is amenable to modifications of its characteristics together with its engaged displacement and is fed by a tank with suction under the head and at ambient pressure which supplies said volumetric metering device.

The mixing mechanism, on the other hand, is operated by the flow of said injected primary fluid and additive fluid and consists of at least one axis equipped with a plurality of blades oriented according to the torque to be transmitted.

Among the uses of the subject device, an example is that of the stoichiometric mixing of an additive with the fuel of an aircraft; the subject device, in fact, through such an injection avoids the separation step of water from fuel, preventing the production and sedimentation of molds and sediments in the tank of an aircraft and at the same time avoids clotting episodes of the fuel with the mixed additive resulting in a substantial reduction in maintenance costs. The proportion of the kerosene additive in a volumetric ratio, in the case at issue, is 1 to 10,000 v/v and is kept practically constant as the flow rate varies within certain limits.

A set of different cartridges with different volumes, depending on the uses and the size of the aircraft to be refueled, can be grafted onto the device.

In a further version, the ergonomic mixing device comprises a blind interference well, or a threaded well, which allows mounting a heat expansion thermometer, or gas thermometer, for the instantaneous and continuous detection of the temperature. The wells, depending on the requirements and work environment, also house manometers (of the mechanical, analog, etc. type). Any thermometers, or manometers, depending on the uses and work environment, are placed in the middle of the mixer body by detecting the average or instantaneous temperature or pressure. Should it be necessary to study or monitor the temperature or pressure variation of the fluid passing through the device, two wells are provided close to the two inlet and outlet flanges.

The subject device includes a grounding connection, which avoids electrostatic accumulations linked to operating environments particularly subject to explosion and/or a connection on the body of the device for the appropriate equipotential bonding with the bodies or surfaces with which the device can come into contact.

Optionally and advantageously, a plurality of instruments which detect the internal pressure of the device are included in the aforementioned mixing system: Optionally at least one instrument that indicates the flow of additive fluid is able to signal the possible lack of passage of the additive fluid and, at the same time, to stop the injection of the primary fluid. Said device, where allowed by the working environment, is inserted in the volumetric metering device. It is also designed to monitor the level and status of the supply of additive fluid.

The ergonomic mixing device is designed to be completely emptied of the mixed fluid for transportation.

The advantages offered by the following invention are clear in the light of the above description and will be even clearer from the accompanying figures and the related detailed description.

DESCRIPTION OF THE FIGURES

The invention will be described hereinafter in at least one preferred embodiment for explanatory and non-limiting purposes with the aid of the attached figures, wherein.

DETAILED DESCRIPTION OF THE INVENTION

The present invention will now be described purely by way of non-limiting or binding example with the aid of the figures, which illustrate some embodiments relative to the present inventive concept.

Figure 1:
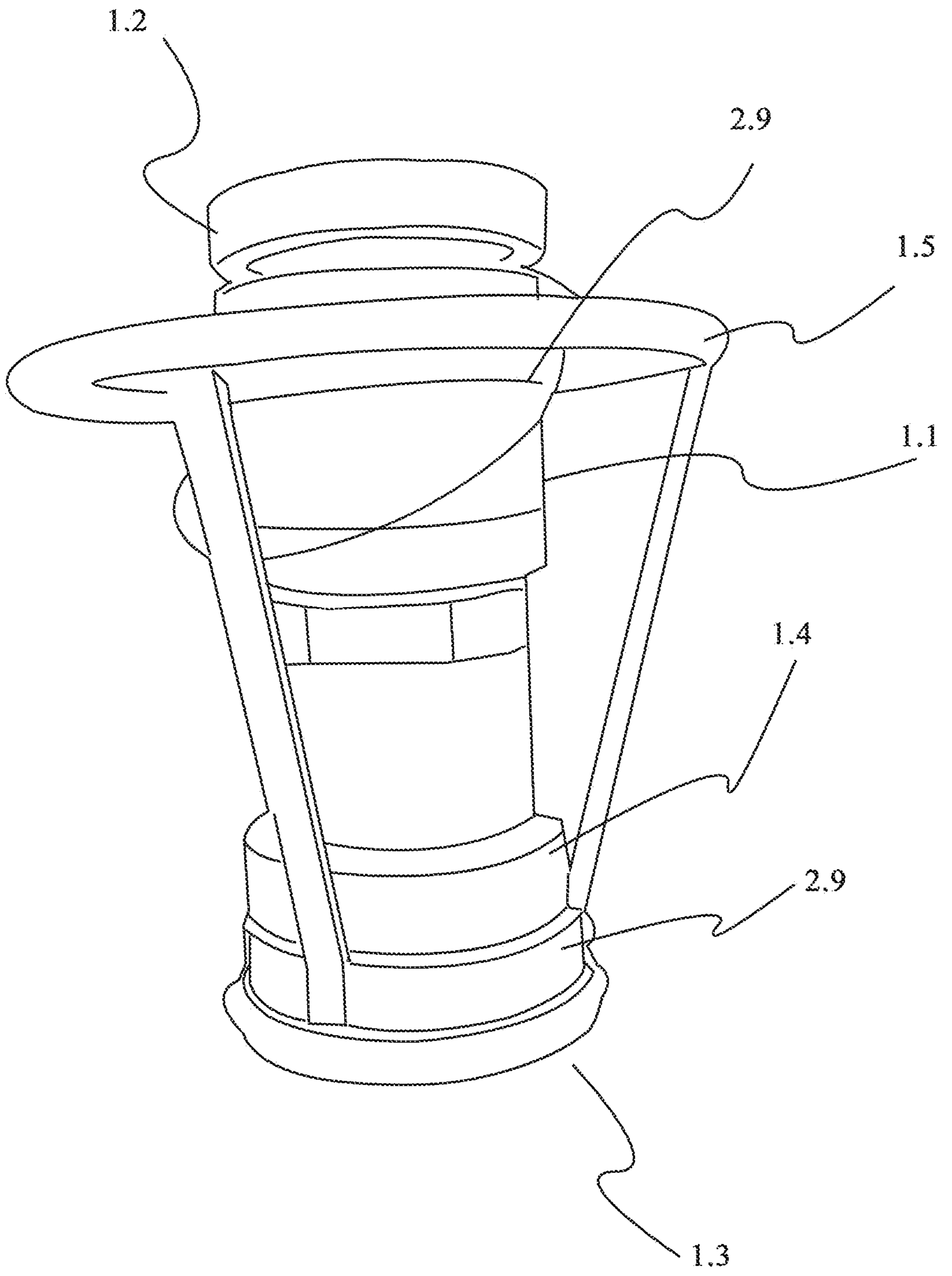
FIG. 1 shows the external components of the ergonomic device for mixing fluids with controlled metering in which a body of the device 1.1 is provided with an ergonomic grip 1.5 and at the two ends of a first flange 1.2 and a second flange 1.3 provided with connection systems 1.4 and a plurality of seals 2.9 inserted in said flanges.
Figure 2:
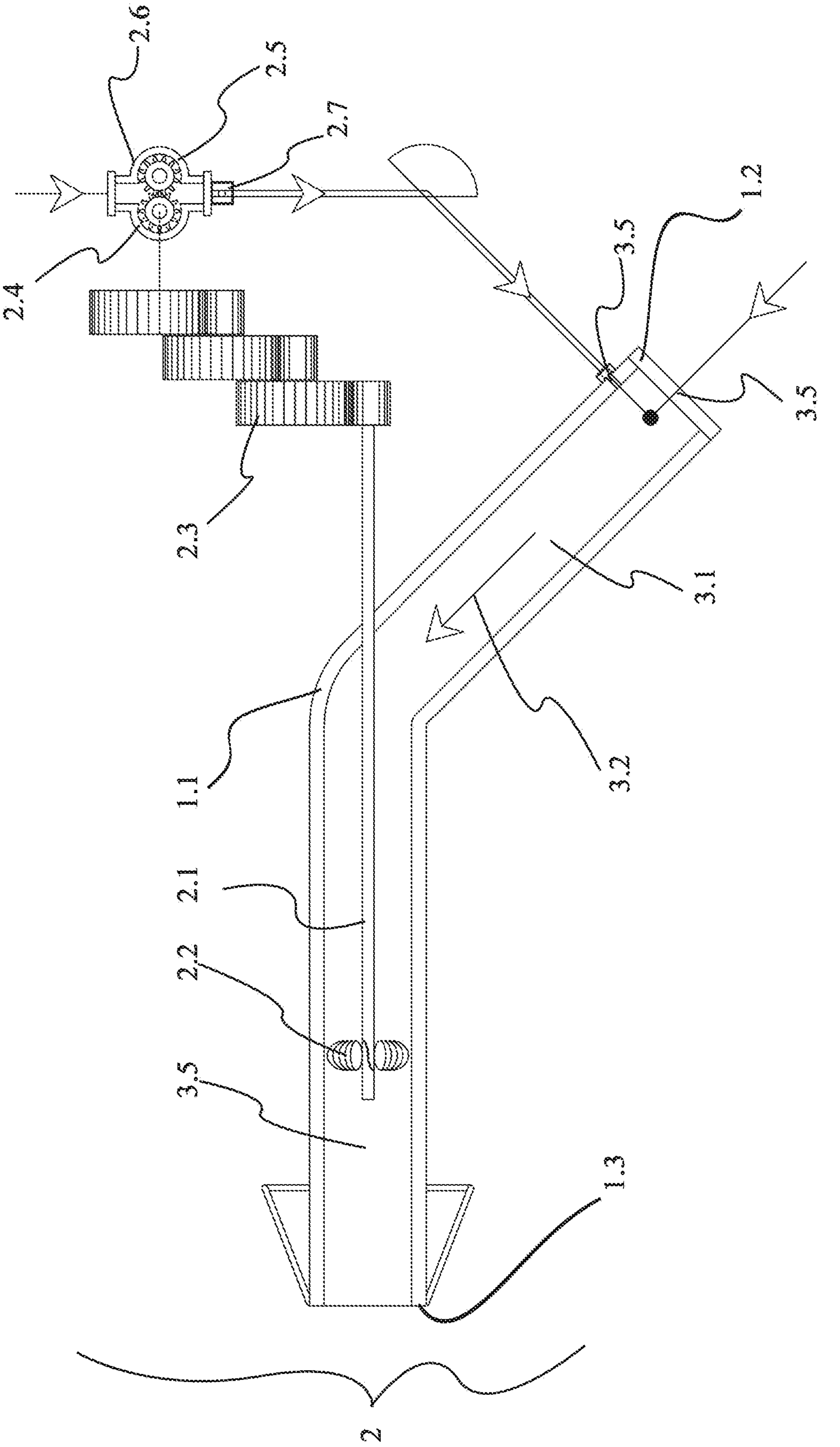
FIG. 2 shows the mixing system 2 located inside the subject device and comprising a mixing mechanism composed of an axis 2.1 and a plurality of blades 2.2, possibly a train of reduction gears 2.3 comprising a train of gear wheels, a pump 2.6 possibly with gears and a final metering nozzle 2.7 surrounded by a gearbox 2.8 or inserted inside the device. The mixing system 2 includes instruments 3.1 suitable for detecting the internal pressure of the device, an instrument 3.2 indicating the flow of the additive fluid, suitable for detecting the flow of the primary fluid or of the mixed fluid.

With reference to FIG. 1 the ergonomic device for mixing fluids with controlled metering is shown, whereas in FIG. 2 the mixing system 2 is shown, whose parts 2.1, 2.2 are inserted inside the aforementioned device (or if necessary in a box integrated thereto) which allows automatic mixing and in a predetermined quantity of an additive fluid with a primary fluid, injected by a common external or internal supply device.

A first coupling flange 1.2 and a second coupling flange 1.3 are positioned respectively at the two ends of the subject ergonomic mixing device: the first one allows the injection of the primary fluid once connected to an external supply device, the second one allows the connection of the subject mixing device to a common mouth of any one loading device, allowing the flow of the mixed liquid. Both the aforesaid flanges 1.2 and 1.3 are equipped with a plurality of connection systems and a plurality of seals housed in the zone which prevent any fluid leaks.

As shown in FIG. 1 a body of the device 1.1, substantially cylindrical in shape, is provided with at least one ergonomic grip 1.5, with a "steering wheel" or in a "dual 180° cloche" configuration positioned on the external surface of the body of the device 1.1, The grip 1.5, in the preferred embodiment, is interchangeable with other compatible handles according to the type and position of the loading mouth to which the subject device is to be connected. The grip 1.5 allows an operator an ease and safety of use in handling phase. Alternatively, in the case of special operations, this grip 1.5 has a configuration with collapsible or removable knobs.

The aforementioned mixing system 2 is housed inside the body of the device 1.1, which allows the flow of the aforementioned primary fluids and additive fluid to be mixed at predetermined pressures and comprises:

- a mixing mechanism,
- a possible train of reduction gears 2.3,
- a gear pump 2.6 or equivalent device,
- a possible gearbox 2.8 containing said train of reduction gears 2.3,
- a final metering nozzle 2.7.

The gearbox, if any, 2.8, as shown in FIG. 2, surrounds the gear pump 2.6 or its equivalent device, the train of reduction gears 2.3 and the aforementioned nozzle 2.7.

In an alternative version, the box of any gears 2.8 is inserted in an external branch of the body of the device 1.1.

Any train of reduction gears 2.3 may consist of a series of gear wheels which, through a rotary motion, brings the number of revolutions and the torque required to the necessary values, commensurate with the quantity of additive fluid necessary to obtain a stoichiometric metered dose of the two fluids to be mixed and to ensure the ratio, expressed in volumes, commensurate with the quantity of additive fluid necessary for the operation of the entire mixing system 2. The pump 2.6, possibly with gears, then generates a pressure and flow rate of the additive fluid such that it is injected into the primary fluid. This pump can be provided with a plurality of add-ons which allow to vary the flow rate and the pressure generated by said optional pump 2.6 according to the mechanical characteristics of the additive fluid to be injected. The subject device is configured to vary the metered dose ratios by varying said pump 2.6 compatibly with the different uses.

The primary fluid, by means of the transmission system, drives the pump 2.6 making it perform an appropriate number of revolutions according to its speed. The flow rate may undergo certain variations depending on the field of application of the device, for example, in the case of aircraft, from 500 l/min, up to a flow rate of 900 l/min, furthermore, the pump 2.6 is fed from a tank with suction under the head (or from a bottle) and at ambient pressure which feeds the final metering nozzle 2.7. The latter injects the aforementioned stoichiometric quantity of additive fluid, based on the detected volume of the primary fluid to be mixed, before both fluids reach the mixing mechanism. The aforesaid mechanism, receiving the thrust from the flow of the aforesaid two fluids, becomes activated and activates the mixing of both the primary and additive fluids by means of an axis 2.1 and a plurality of blades 2.2 oriented as a function of the torque to be transmitted.

In a further version, the subject ergonomic mixing device comprises a blind interference well, or a threaded well, which allows mounting a heat expansion thermometer, or gas thermometer, for the instantaneous and continuous detection of the temperature. The wells, depending on the requirements and work environment, also house manometers (of the mechanical, analog, etc. type). The thermometer, or manometer, depending on the uses and work environment, is placed in the middle of the mixer body by detecting the average or instantaneous temperature or pressure.

Furthermore, a grounding device avoids electrostatic accumulations linked to operating environments particularly prone to explosion. Where possible, the use of electrically dispersive material (ESD) and/or a connection on the body of the device 1.1 is envisaged for the appropriate equipotential bonding with the bodies or surfaces with which the device can come into contact.

Finally, the subject ergonomic device for mixing fluids comprises:

- a plurality of instruments 3.1 relevant to the internal pressure of the device: these are mechanical pressure gauges for measuring pressure;
- where allowed by the working environment conditions, at least one instrument 3.2 is provided for measuring the flow of the additive fluid which signals any lack of passage of the aforementioned fluid and, at the same time, stops the injection of the primary fluid; the aforementioned tool is dedicated to monitoring the level and status of the supply of additive fluid.
- The ergonomic mixing device is designed to be completely emptied of the mixed fluid, and to be refilled with additive fluid by means of a plurality of reloading cartridges containing a predetermined quantity of additive fluid.

Finally, it is clear that modifications, additions or variants may be made to the invention described thus far which are obvious to a man skilled in the art, without departing from the scope of protection that is provided by the appended claims.

The invention claimed is:

1. An ergonomic device for mixing fluids with controlled metering provided with at least a mixing system adapted to allow, following injection of a stoichiometric quantity of an additive fluid and of a primary fluid injected by a common external supply device, a predetermined automatic mixing; said ergonomic device for mixing fluids comprising:

- at least a first coupling flange with said external supply device, provided with a plurality of connection systems and with a plurality of seals housed in a zone, adapted to contain fluid leaks;
- a second coupling flange adapted to connect the ergonomic device for mixing fluids to a mouth of any one loading device adapted to receive liquids; said second coupling flange comprising a plurality of seals housed in the zone, adapted to prevent fluid leaks;
- a body of the device adapted to allow the flow of said primary fluid and of said additive fluid to be mixed at predetermined pressures; said body of the device having substantially cylindrical shape and being adapted to house a mixing mechanism;
- said mixing mechanism being adapted to be actuated by the flow of said injected primary fluid and additive fluid and being constituted by at least an axis which, by means of a plurality of blades oriented as a function of a torque to be transmitted; said mixing mechanism being housed inside said body of the device;
- at least an ergonomic grip, comprised on an external surface of said body of the device adapted to allow an operator to have an ease of use and safety in handling phase; said ergonomic grip being interchangeable with other compatible grips depending on the type and position of a loading mouth to which said device must be connected;

an integrated train of reduction gears, comprising a series of indented wheels, adapted to bring a number of revolutions and the torque to values necessary for operation of said mixing system; a relative torque and transmission ratio being related to the quantity of additive fluid necessary for obtaining predetermined metering and for ensuring an expressed ratio in volumes;

at least a gear pump adapted to generate pressure and flow rate of the additive fluid to be injected in said stoichiometric quantity within the flow of said primary fluid; said pump comprising an adaptable capacity and accessories adapted to vary the flow rate and the pressure generated by said pump depending on mechanical characteristics of the additive fluid to be injected;

a gear box adapted to surround said train of reduction gears comprising said indented wheels; said gear box being inserted inside said body of the device;

a final metering nozzle adapted to inject a stoichiometric quantity of additive fluid based on a volume of the primary fluid to be mixed;

said ergonomic mixing device can be completely emptied of the mixed fluid in order to be safely transported; said pump being adapted to conduct said primary fluid at a flow rate adaptable for the type of application requested; said gear pump for the additive being fed by a tank with positive suction head and at ambient pressure; said tank being adapted to refuel said final metering nozzle.

2. The ergonomic device for mixing fluids with controlled metering, according to claim 1, further comprising a plurality of reloading cartridges adapted to provide a predetermined quantity of additive fluid and adapted to comply with an ambient pressure at sea level.

3. The ergonomic device for mixing fluids with controlled metering, according to claim 1, further comprising:

a blind interference well, or a threaded well, which allows mounting a heat expansion thermometer, or gas thermometer, for the instantaneous detection of a size;

a thermometer for the continuous detection of the temperature.

4. The ergonomic device for mixing fluids with controlled metering, according to claim 1, further comprising a device for grounding, adapted to prevent electrostatic accumulation tied to operating environments that are particularly subject to explosion, and it is provided to use, where possible, electrically dispersive material and/or a connection on the body of the device for suitably placing at equipotential with bodies or the surfaces with which the device can come into contact.

5. The ergonomic device for mixing fluids with controlled metering, according to claim 1, further comprising instruments adapted to detect the pressure or temperature or internal flow rate of the device: said instruments being mechanical manometers for measuring the pressure, the temperature and the flow rate; said instruments allowing displaying data relative to the pressure, temperature and instantaneous and average flow rate.

6. The ergonomic device for mixing fluids with controlled metering, according to claim 1, further comprising, where allowed by the work environment, at least an indicator of additive fluid flow adapted to signal the lack of passage of the additive fluid and, simultaneously, stop the injection of the primary fluid; an instrument being arranged for monitoring the level and the state of the additive supply.

7. The ergonomic device for mixing fluids with controlled metering, according to claim 1, further comprising a plurality of instruments adapted for displaying a poor flow of primary fluid, of a reduced flow of mixed fluid and signaling a total lack of flow of the primary or mixed fluid.

8. The ergonomic device for mixing fluids with controlled metering, according to claim 1, wherein said body of the device comprises a grip with collapsible or movable knobs.

9. The ergonomic device for mixing fluids with controlled metering, according to claim 1, wherein the device is configured for varying metering ratios by varying geometric characteristics of said pump compatibly with different uses.

10. The ergonomic device for mixing fluids with controlled metering, according to claim 1, wherein said gear box is inserted in an external branch of the body of the device.

11. The ergonomic device for mixing fluids with controlled metering, according to claim 2, further comprising:

a blind interference well, or a threaded well, which allows mounting a heat expansion thermometer, or gas thermometer, for the instantaneous detection of a size;

a thermometer for the continuous detection of the temperature.

12. The ergonomic device for mixing fluids with controlled metering, according to claim 2, further comprising a device for grounding, adapted to prevent electrostatic accumulation tied to operating environments that are particularly subject to explosion, and it is provided to use, where possible, electrically dispersive material and/or a connection on the body of the device for suitably placing at equipotential with bodies or the surfaces with which the device can come into contact.

13. The ergonomic device for mixing fluids with controlled metering, according to claim 3, further comprising a device for grounding, adapted to prevent electrostatic accumulation tied to operating environments that are particularly subject to explosion, and it is provided to use, where possible, electrically dispersive material and/or a connection on the body of the device for suitably placing at equipotential with bodies or the surfaces with which the device can come into contact.

14. The ergonomic device for mixing fluids with controlled metering, according to claim 2, further comprising instruments adapted to detect the pressure or temperature or internal flow rate of the device: said instruments being mechanical manometers for measuring the pressure, the temperature and the flow rate; said instruments allowing displaying data relative to the pressure, temperature and instantaneous and average flow rate.

15. The ergonomic device for mixing fluids with controlled metering, according to claim 3, further comprising instruments adapted to detect the pressure or temperature or internal flow rate of the device: said instruments being mechanical manometers for measuring the pressure, the temperature and the flow rate; said instruments allowing displaying data relative to the pressure, temperature and instantaneous and average flow rate.

16. The ergonomic device for mixing fluids with controlled metering, according to claim 4, further comprising instruments adapted to detect the pressure or temperature or internal flow rate of the device: said instruments being mechanical manometers for measuring the pressure, the temperature and the flow rate; said instruments allowing displaying data relative to the pressure, temperature and instantaneous and average flow rate.

17. The ergonomic device for mixing fluids with controlled metering, according to claim 2, further comprising, where allowed by the work environment, at least an indicator of additive fluid flow adapted to signal the lack of passage of the additive fluid and, simultaneously, stop the injection of the primary fluid; an instrument being arranged for monitoring the level and the state of the additive supply.

18. The ergonomic device for mixing fluids with controlled metering, according to claim 3, further comprising, where allowed by the work environment, at least an indicator of additive fluid flow adapted to signal the lack of passage of the additive fluid and, simultaneously, stop the injection of the primary fluid; an instrument being arranged for monitoring the level and the state of the additive supply.

19. The ergonomic device for mixing fluids with controlled metering, according to claim 4, further comprising, where allowed by the work environment, at least an indicator of additive fluid flow adapted to signal the lack of passage of the additive fluid and, simultaneously, stop the injection of the primary fluid; an instrument being arranged for monitoring the level and the state of the additive supply.

20. The ergonomic device for mixing fluids with controlled metering, according to claim 5, further comprising, where allowed by the work environment, at least an indicator of additive fluid flow adapted the to signal lack of passage of the additive fluid and, simultaneously, stop the injection of the primary fluid; an instrument being arranged for monitoring the level and the state of the additive supply.

* * * * *